Nov. 1, 1966  K. V. RAY  3,282,375
MOBILE STAND FOR HUNTERS CONVERTIBLE TO A HAND CART
Filed April 22, 1965  2 Sheets-Sheet 1
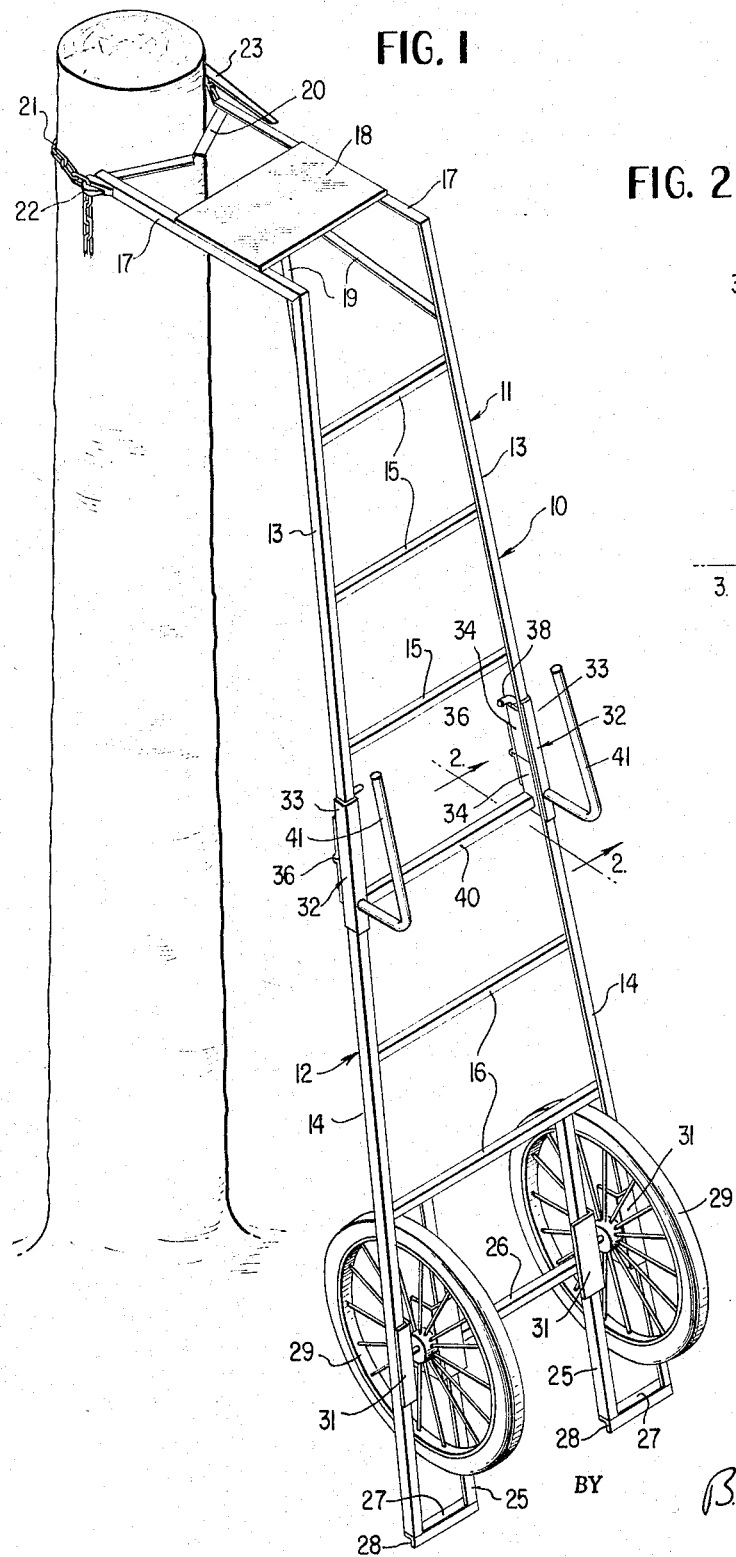
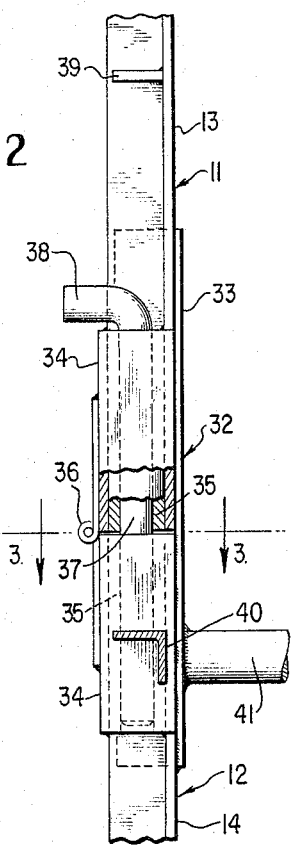
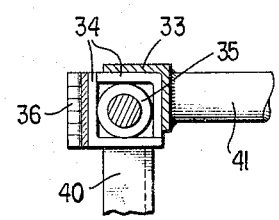
INVENTOR
KENNETH V. RAY
BY
*B. P. Fishburne Jr.*
ATTORNEY Nov. 1, 1966  K. V. RAY  3,282,375
MOBILE STAND FOR HUNTERS CONVERTIBLE TO A HAND CART
Filed April 22, 1965  2 Sheets-Sheet 2
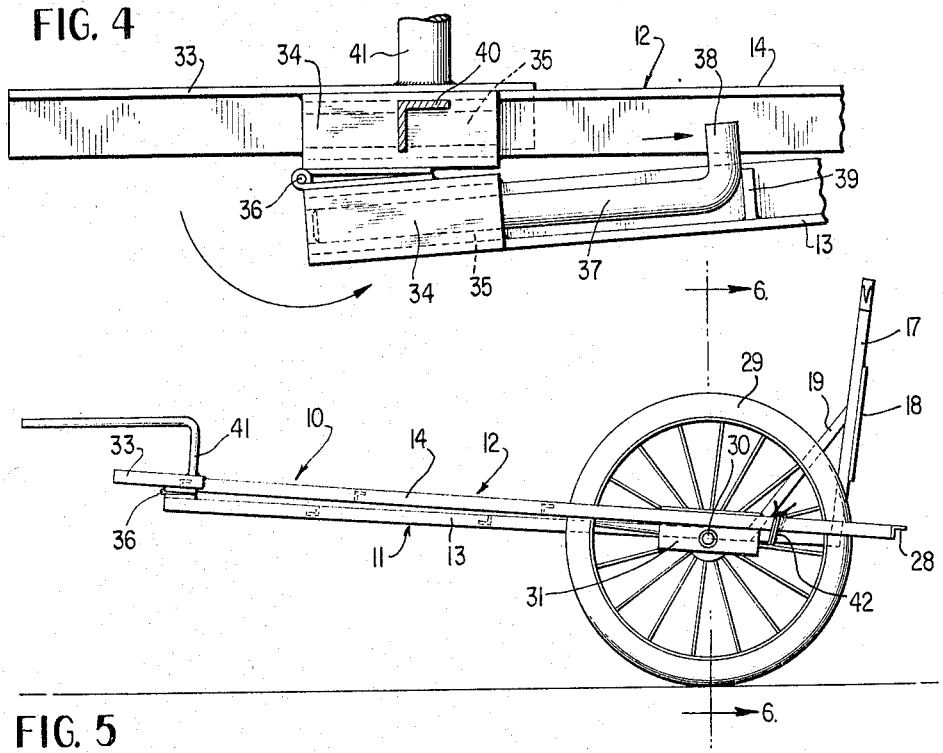
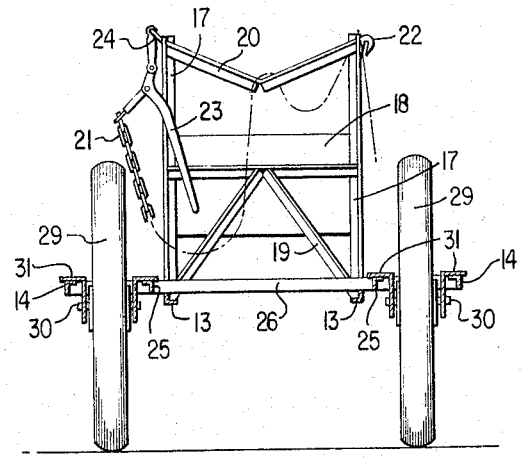
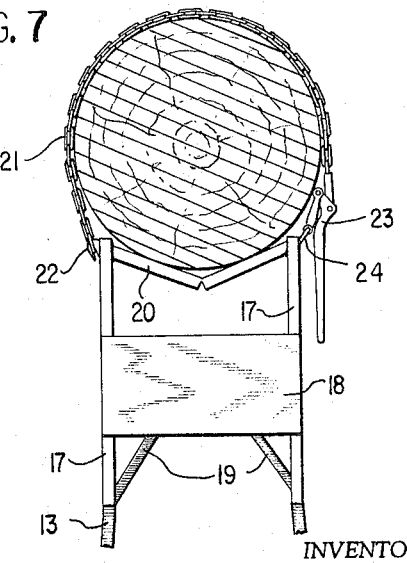
INVENTOR
KENNETH V. RAY
BY *B. P. Fishburn, Jr.*
ATTORNEY United States Patent Office 3,282,375
Patented Nov. 1, 1966

3,282,375
MOBILE STAND FOR HUNTERS CONVERTIBLE
TO A HAND CART
Kenneth V. Ray, P.O. Box 303, Devers, Tex.
Filed Apr. 22, 1965, Ser. No. 449,962
5 Claims. (Cl. 182—16)

This invention relates to a mobile elevated stand or support for hunters, readily convertible to a cart for hauling game and equipment.

The object of the invention is to provide a readily portable stand of considerable height for deer hunters and the like which can be quickly erected and stabilized by connection with a tree so that the hunter is securely positioned above the line of vision of the deer and above the point where the deer is likely to detect the scent of the hunter.

Another important object of the invention is to provide a mobile stand for hunters which is quickly and easily converted to a two wheeled carrier or cart allowing the hunter to easily transport quite heavy loads over rough terrain.

Another object of the invention is to provide a device of the mentioned character which is extremely rugged and durable in construction, economical to manufacture, and very easy to use for a variety of purposes in addition to hauling game and camping equipment.

Other objects and advantages of the invention will become apparent to those skilled in the art during the course of the following detailed description.

In the accompanying drawings forming a part of this application and in which like numerals are employed to designate like parts throughout the same, FIGURE 1 is a perspective view of the invention illustrating the same during use as an elevated stand or support for hunters;

FIGURE 2 is an enlarged fragmentary vertical section taken on line 2—2 of FIGURE 1;

FIGURE 3 is a fragmentary horizontal section taken on line 3—3 of FIGURE 2;

FIGURE 4 is an enlarged fragmentary vertical section, similar to FIGURE 2, illustrating the folding of the invention to convert the stand into a two wheeled cart;

FIGURE 5 is a side elevation of the invention after conversion to said cart;

FIGURE 6 is a transverse vertical section taken on line 6—6 of FIGURE 5; and

FIGURE 7 is a fragmentary plan view of the invention as shown in FIGURE 1.

In the drawings, wherein for the purpose of illustration is shown a preferred embodiment of the invention, the numeral 10 designates a longitudinally foldable rigid frame including a pair of frame sections 11 and 12 which together form the body portion of the invention. When the frame 10 is in the extended or unfolded position, during use as a support for the hunter, FIGURE 1, the frame section 11 is uppermost and the section 12 is lowermost. In this position, the side bars 13 and 14 of the two frame sections are longitudinally aligned to extend continuously for the full height of the frame and the side bars converge somewhat toward the top of the frame, as shown in FIGURE 1. The side bars 13 and 14 are cross-braced at intervals with transverse bars 15 and 16 forming ladder rungs on the extended frame so that the hunter may ascend to the platform support at the top of the device.

The platform support for the hunter or other user of the device is substantially horizontal during use, FIGURE 1, and is formed by a pair of arms 17 extending transversely of the bars 13 at the top thereof and rigidly secured thereto by welding or the like. A horizontal platform plate 18 adapted to serve as a seat is rigidly mounted upon the arms 17 and a pair of diagonal braces 19 extend from the upper end portions of the bars 13 to the bottom of the plate 18 to strengthen the platform support.

A V-shaped cross member 20 rigidly interconnects the ends of arms 17 and is adapted to rest against the trunk of the tree for stabilizing the invention device while in the extended position. An adjustable chain 21 is provided having links engageable with a hook 22 on one arm 17, and adapted to encircle the tree, as shown in FIGURES 1 and 7. The other end of the chain is connected with a conventional chain tightening lever mechansm 23 in turn connected through a link 24 with the other arm 17. The adjustable chain 21 is utilized with the V-shaped bar 20 to lash the top of the extended device to a sturdy tree during use.

In order to stabilize the lower end of the structure and prevent slippage thereof and to elevate the wheels from the ground during the use of the structure as a stand, a pair of additional leg members 25 are arranged inwardly of the bars 14 in generally parallel relation thereto and have their upper ends rigidly secured to the lowermost rung 16. The leg members 25 are further interconnected near their midpoints by a cross-brace 26 forming the lowermost ladder rung of the device while used as in FIGURE 1. At the bottoms of the leg members 25 and bars 14, short transverse foot elements 27 are rigidly secured thereto, having downturned flanges 28 serving as cleats to dig into the earth and prevent slippage during use.

A pair of relatively large diameter preferably rubber tired wheels 29 are arranged between leg members 25 and side bars 14, as shown in the drawings, and the wheels are journaled for rotation on short axles 30, FIGURE 6, supported by L-shaped bearing brackets 31, welded or otherwise rigidly secured to the leg members 25 and bars 14, as shown. The construction for mounting the wheels is very simple and compact and extremely sturdy and durable. The wheels are somewhat protected between the leg members 25 and side bars 14 and between the rung 16 and foot elements 27. These structural members surround the wheels, as shown.

With particular reference to FIGURES 2 through 5, the fully extended device shown and described in connection with FIGURE 1 is readily convertible by a simple folding operation to a two wheeled hand cart, as depicted in FIGURE 5. To accomplish this conversion of the structure, a pair of sturdy hinge joints 32 are provided in the frame 10. Each such hinge joint comprises an angle bar extension 33 on one of the side bars 14, rigidly secured thereto by welding. As shown in FIGURES 2 and 1, the bar extension 33 embraces and stabilizes the lower end portions of bar 13 when the device is extended as in FIGURE 1. The hinge joint 32 on each side of the frame 10 further consists of a pair of short lengths 34 of angle bars arranged in opposed interfitting relation, FIGURE 3, and welded together and also welded to the terminal opposed ends of the side bars 13 and 14. Inside of the pairs of elements 34 are short tubes 35, also rigidly secured to the elements 34 by welding. The pairs of angle bar sections 34 with the tubes 35 inside of them are interconnected hingedly by a hinge 36 on the side of the assembly remote from the extensions 33. When the tubes 35 are aligned axially as shown in FIGURE 3, they both receive a locking bolt or pin 37 having a handle 38. Each bolt 37 is retractable from the lower tube 35 to allow breaking of the hinge joint but the extent of retraction of each bolt is limited by a positive stop element 39 on each side bar 13 of upper frame section 11. In this manner, the bolts 37 cannot be lost or separated from the assembly. The hinge joint is very sturdy and also compact and simplified. When the bolts 37 are in the active positions, FIGURES 1 and 2, the extended frame 10 is very rigid and cannot collapse or fold. When the bolts are retracted, FIGURE 4, the upper frame section 11 is bodily swingable downwardly and underneath of the lower frame section 12, as shown clearly in FIGURES 4 and 5.

An additional cross-brace 40 extends between the lower elements 34 on each side of the device and is welded securely thereto and forms another ladder rung in the frame while extended, FIGURE 1. Sturdy L-shaped handles 41 are welded to the extensions 33 and are therefore carried by the lower frame section 12 and are utilized to guide and propel the hand cart in the general manner of a wheelbarrow when the structure is folded, FIGURE 5. The handles 41 are spaced somewhat above the folded frame structure and extend somewhat rearwardly thereof, as shown in FIGURE 5.

When the structure is thus folded, as previously noted, the upper frame section 11 swings beneath the frame section 12 and the platform support including arms 17 and plate member 18 are upwardly directed substantially at right angles to the folded frame and well forwardly of the wheel axles 30. In this position, the arms 17 and plate member 18 form an abutment to prevent forward displacement of a deer carcass or any other load which may be placed upon the cart. The underfolded frame section 11 may be lashed securedly in the folded position, FIGURE 5, by lengths of rope, wire or the like, indicated at 42. Any other suitable securing means for this purpose may be employed. The underfolded frame section 11 does not bear the weight of whatever load is on the cart, and such weight is directly borne by the overlying frame section 12.

Because of the size of the wheels 29 and the well balanced construction of the cart, the same is very easy to maneuver over rough terrain even while a quite heavy load of several hundred pounds is mounted thereon.

Substantially the entire construction may be fabricated from angle bar stock, as shown in the drawings, and the construction is preferably welded throughout for simplicity and strength. It is thought that the wide utility of the invention as a supporting stand and hand cart should now be readily apparent without the necessity for any further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

The invention having been described, what is claimed is:

1. A hunter's elevated stand readily convertible to a hand cart for transporting game comprising first and second frame sections of approximately equal length each having longitudinal side bars and longitudinally spaced cross bars secured to the side bars and adapted to serve as ladder rungs when the first and second frame sections are longitudinally extended and lie substantially in a common plane, means hingedly connecting adjacent ends of the first and second frame sections whereby the latter may be extended longitudinally or folded in substantially superposed coextensive relation with the second frame section beneath the first frame section, a platform extension secured to the second frame section substantially at its end remote from said means and projecting generally at right angles thereto beyond one side thereof only, and a laterally spaced pair of wheels on the first frame section near the end thereof remote from said means, the arrangement being such that folding of the second frame section underneath of the first frame section causes said platform extension to project upwardly above the first and second frame sections substantially at right angles thereto between and adjacent to said wheels so as to form a forward abutment on the cart for securing game thereon.

2. The invention as defined by claim 1, and a pair of handles on said first frame section near the end thereof remote from said wheels.

3. The invention as defined by claim 1, and a pair of leg extensions on the first frame section projecting forwardly of said wheels and being disposed substantially in a plane through the axis of rotation of said wheels.

4. The invention as defined by claim 1, and manually operable means on the platform extension for securing the same to the trunk of a tree.

5. The invention as defined by claim 1, and releasable bolt means forming a part of said means operable to releasably lock the first and second frame sections in longitudinally extended relationship.

References Cited by the Examiner

UNITED STATES PATENTS

| | | | |
|---|---|---|---|
| 983,188 | 1/1911 | Walters | 182—24 |
| 1,004,550 | 10/1911 | Bertke | 182—21 |
| 2,834,526 | 5/1958 | Paris | 182—16 |
| 3,057,431 | 10/1962 | George | 182—116 |

FOREIGN PATENTS

| | | |
|---|---|---|
| 25,635 | 9/1906 | Austria. |

REINALDO P. MACHADO, *Primary Examiner.*